Aug. 26, 1924. 1,506,654
A. J. MICHELIN
DEVICE FOR REMOVING PNEUMATIC TIRES OF THE CLINCHER TYPE
Filed Dec. 1, 1922 4 Sheets-Sheet 2
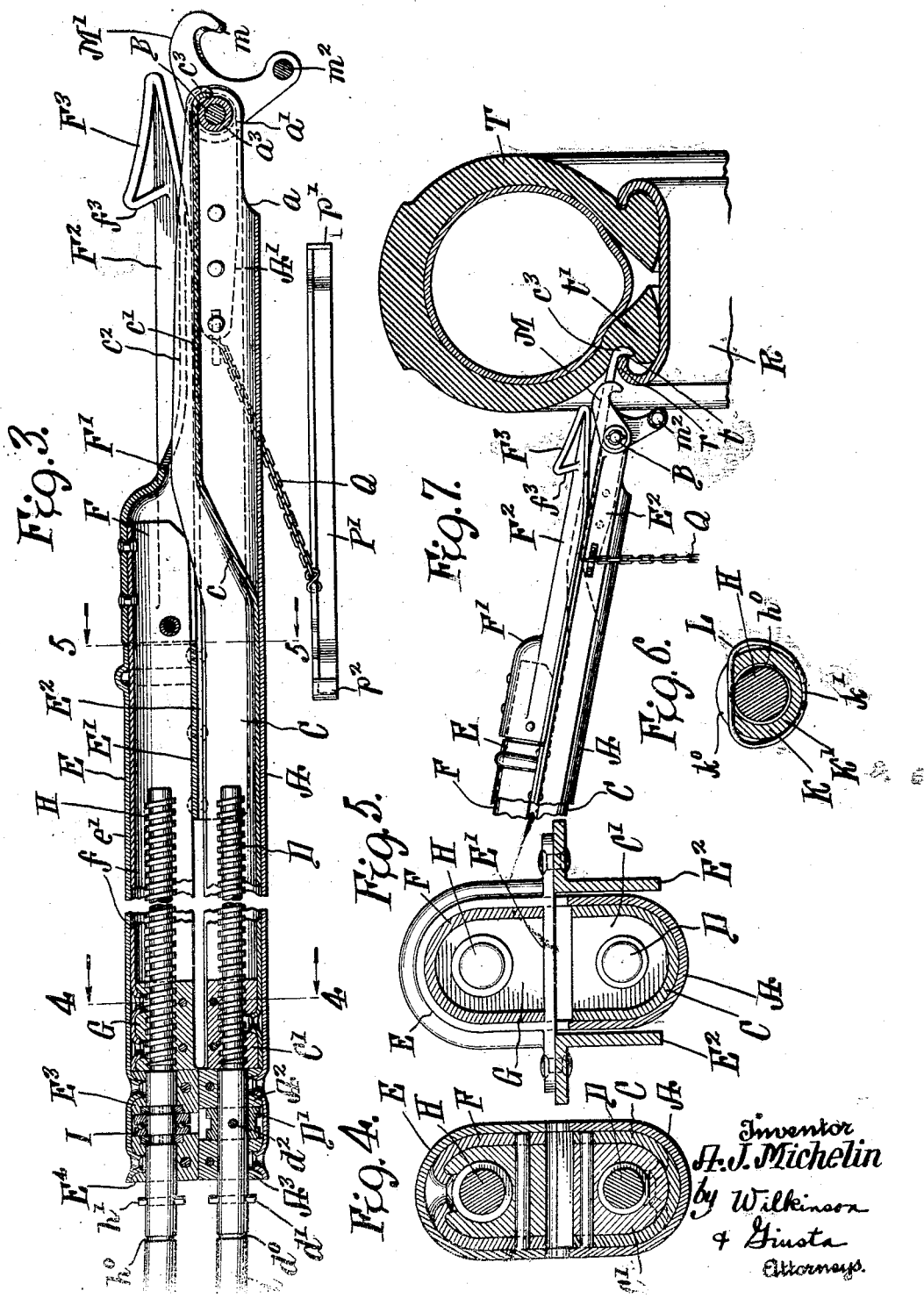

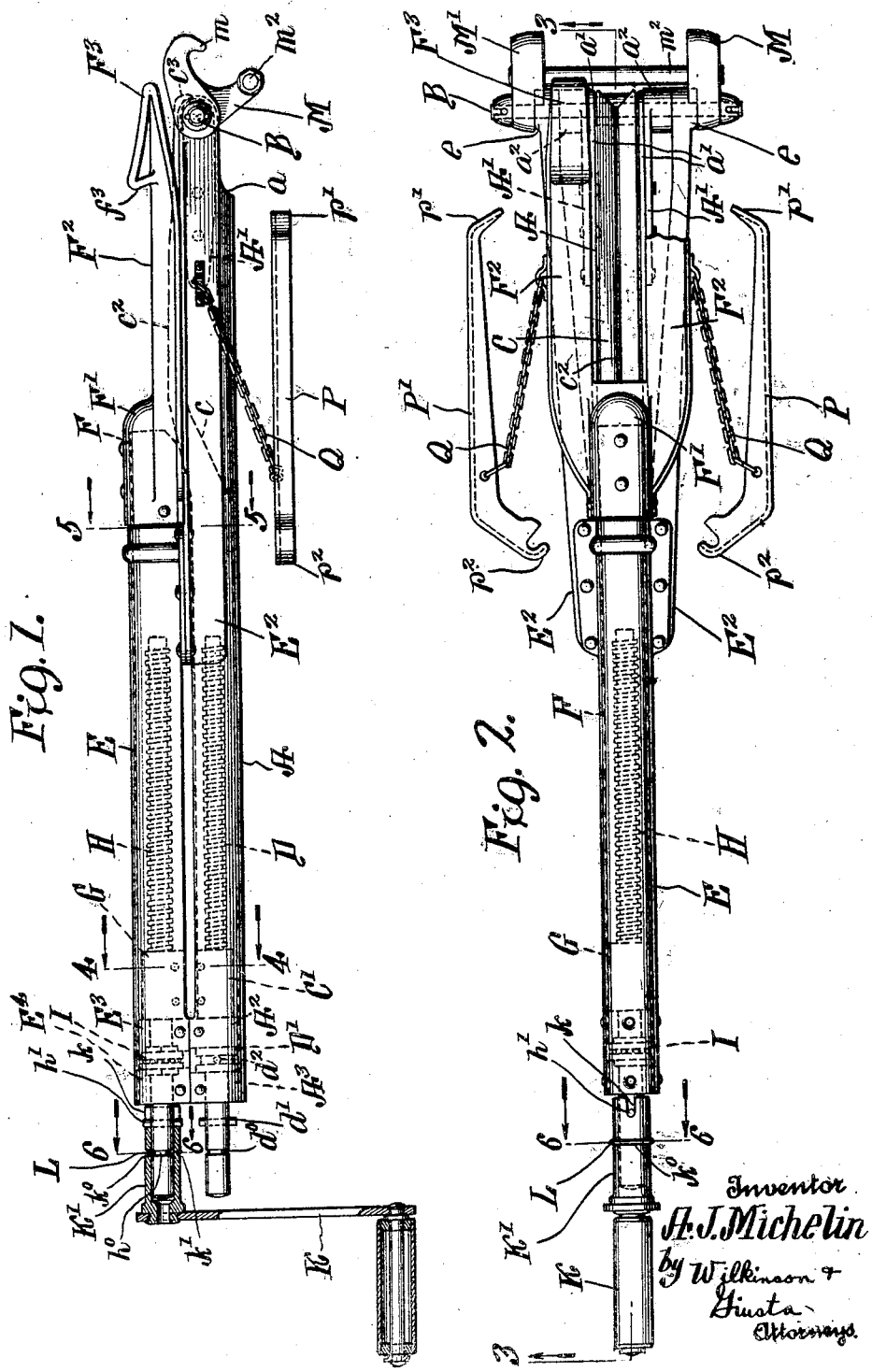

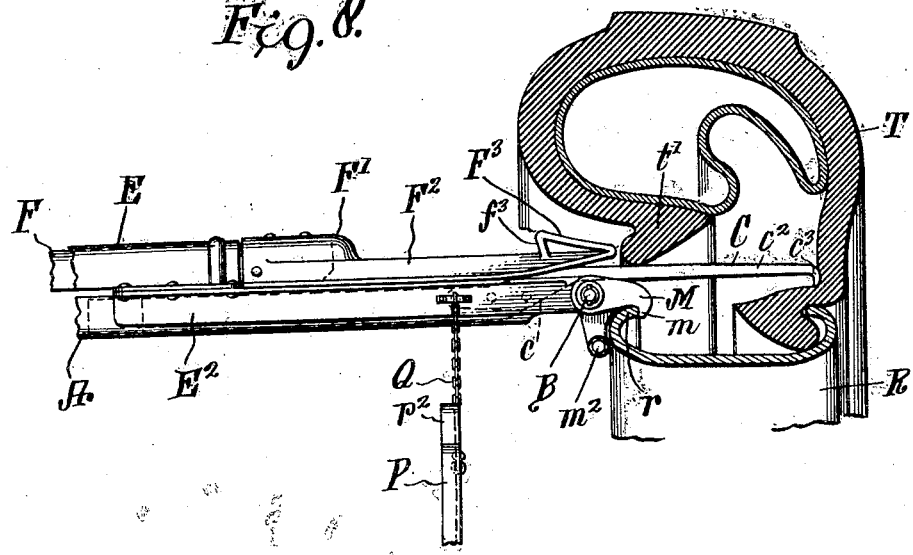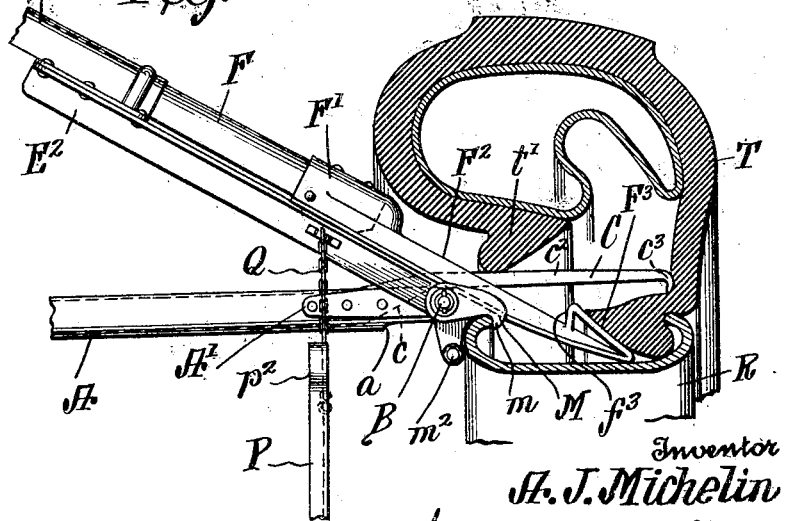

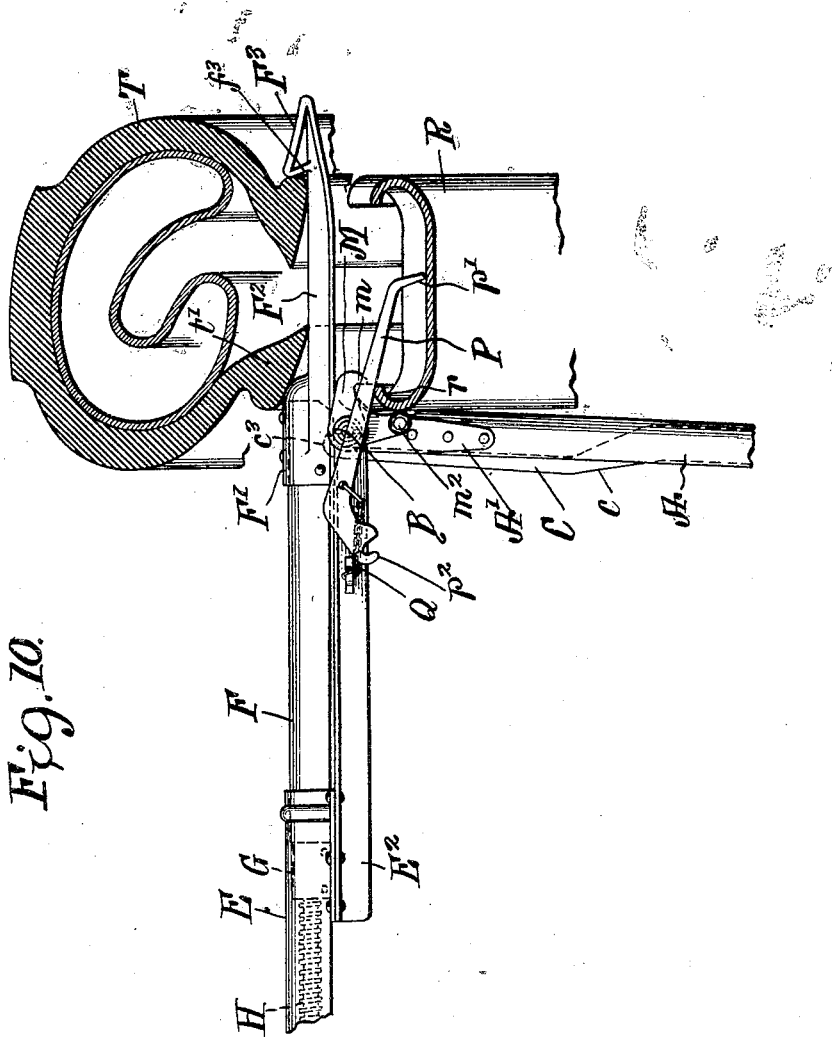

Patented Aug. 26, 1924.

1,506,654

UNITED STATES PATENT OFFICE.

ANDRÉ JULES MICHELIN, OF CLERMONT-FERRAND, FRANCE.

DEVICE FOR REMOVING PNEUMATIC TIRES OF THE CLINCHER TYPE.

Application filed December 1, 1922. Serial No. 604,350.

*To all whom it may concern:*

Be it known that I, ANDRÉ JULES MICHELIN, a citizen of the French Republic, residing at Clermont-Ferrand, France, have invented certain new and useful Improvements in Devices for Removing Pneumatic Tires of the Clincher Type; and I do hereby declare the following to be a full, clear, and exact description of the invention, such as will enable others skilled in the art to which it appertains to make and use the same.

My present invention relates to improvements in means for removing pneumatic tires from wheels of the clincher rim type, and it consists in providing a convenient tool which may be readily carried along in the tool kit of the automobile and may be conveniently used to facilitate the removal of the pneumatic tire when it is desired to take off same for any reason.

As is well known, the principal difficulty in changing tires is the removal of the deflated tire from the rim of the wheel. This is more frequently done on the road, and ordinarily such a tire is removed by means of levers of various forms, and the operation is long and strenuous. This is particularly true for large sizes of tires, for the removal of which considerable force is required.

The present invention consists in providing a device which will permit the detaching of the tire of the clincher type rapidly and with little effort, whatever may be the dimension of the tire or of the wheel on which it is mounted.

My invention will be more clearly understood after reference to the accompanying drawings, in which like parts are indicated by similar reference symbols throughout the several views, and in which:—

Figure 1 shows a side elevation of the complete tool, parts being broken away.

Figure 2 is a plan view of the complete tool shown in Fig. 1.

Figure 3 shows a central vertical section along the line 3—3 of Fig. 2, and looking in the direction of the arrows, parts being broken away and the handle being omitted. The parts in this figure are shown on a somewhat larger scale than in Figs. 1 and 2.

Figure 4 shows a section along the line 4—4 of Figs. 1 and 3, and looking in the direction of the arrows.

Figure 5 shows a section along the line 5—5 of Figs. 1 and 3, and looking in the direction of the arrows.

Figure 6 shows a section along the line 6—6 of Figs. 1 and 2, and looking in the direction of the arrows.

Figure 7 is a diagram showing the engaging end of the tool at the beginning of the operation of removing the tire, the tire and rim being shown in section; and Figures 8, 9 and 10 are similar views to Fig. 7, but show the later steps in the operation of removing the tire.

A represents a swinging arm which is substantially in the form of an open trough, as shown in Fig. 5, and is cut away near its forward end, as at $a$, and terminates in two arms $a'$ which are pivoted about the main pivot pin B, see Fig. 3.

These arms $a'$ are reinforced near their pivot by the reinforcing plates A' having annular hubs $a^2$ which serve to broaden the pivot bearings of the arm A, and reinforce the pivot end thereof, see Fig. 2. The arms $a'$ are connected together about their pivot by the sleeve $a^3$, which also is rotatably journaled on the main pivot pin B, and serves as a bearing for the sliding hook-shaped end $c^3$ of the sliding pusher arm C, as will be hereinafter more fully described.

The pusher arm C has its rear end preferably in the form of a U-shaped trough to slide freely in the arm A, as shown in Figs. 3, 4 and 5, and this arm, towards its forward end, is bent upwards, as at $c$, so as to have the portions $c'$ project above the top of the swinging arm A. To secure the requisite lightness in strength the end portion of this sliding pusher arm C is preferably V-shaped in cross section, as at $c^2$, and terminates at its forward end in the curved pusher head $c^3$. This sliding arm C is provided near its rear end with a fixed nut C' in which the screw D engages. This screw has its rear portion $d$ revolubly mounted in the bearings $A^2$ and $A^3$, see Fig. 3, which bearings are fast to the swinging arm A, and between these bearings $A^2$ and $A^3$ the thrust bearing block D' is mounted. This thrust bearing block D' is securely attached to the screw D as by the pin $d^2$. This screw D is provided near its rear end with an engaging pin $d'$ and with an annular groove $d^5$, see Fig. 3 for coupling up with the handle, as will be hereinafter described.

It will be seen that by rotating the screw D, the sliding pusher arm C may be moved backwards or forwards as desired. In Fig. 3 I have shown this sliding pusher arm in the rearmost or retracted position, while the said arm is shown in its most forward position in Figs. 8 and 9. It will be noted that the pivoted arm A and the sliding arm C will rock about the same pivot B, but that the arm C may be slid backwards or forwards in said arm A.

Mounted above the arm A, and pivoted about the same pivot B, is the upper swinging arm E, which is in the form of an inverted U, in cross section, as shown in Figs. 4 and 5. This arm E has an open bottom towards the rear, but is provided with a transverse plate E' see Fig. 5, closing a portion of the bottom and serving as a guide for the stripper arm F, as will be hereinafter more fully described. To the flanges of this plate E' the angle irons E² are connected, as shown in Figs. 1, 3 and 5, and these angle irons are provided with journal bearings e at their forward end, as shown in Fig. 2, and pivoted about the main pivot pin B. Thus it will be seen that the upper arm E pivots about the same pivot as the lower arm A, but is entirely independent thereof.

Slidably mounted in the upper arm E is the stripper arm F, whose rear f is slidably mounted in the inverted U-shaped shell e', and carries at its rear a nut G adapted to engage the screw H. This screw has its rear end revolubly mounted in the journal bearings E³ and E⁴ secured in the upper arm E. A suitable thrust bearing I, preferably a ball bearing, as shown in Fig. 3, is mounted between these two bearings E³ and E⁴ so as to take up the thrust on the screw. This screw is provided with a transverse pin h' and with an annular groove h° for convenience in connecting the handle thereto, as will be hereinafter more fully described.

The stripper arm F carries at its forward end a yoke F' terminating in two arms F² whose ends are provided with reinforced substantially V-shaped stripper heads F³. It will be seen that after rotating the screw H the stripper arm F, and with it the stripper heads F³, may be pushed forwards or drawn backwards as desired. It will also be noted that the upper arm E may be rotated about the pivot B, and when so rotated the stripper arm will also be similarly rotated about the pivot.

In order to conveniently turn either of the screws D or H, I provide a common handle K which is so arranged that it may be quickly shifted from one screw to the other as desired. Such a construction of handle is shown in Figs. 1 and 2, in which K' represents a sleeve, slotted, as at k, to receive one or the other of the pins h' or d' as the case may be. This sleeve K' is preferably notched across its upper portion, as at k°, to receive the resilient clip L, and the sleeve is also provided with a groove k' to receive the free end of the clip L, as shown in Fig. 6. This clip, when the handle is applied, will snap into the corresponding groove of the screw, either h° or d° as the case may be, and will secure the handle in place against being accidentally worked off, but at the same time will permit the handle to be readily withdrawn or replaced as desired.

It will be obvious that the handle may be shifted from its mounted position on the screw H to the corresponding position on the screw D; thus one handle will serve for both screws, and obviously it would be impracticable to operate with two separate handles unless there was considerable space provided between the screws.

Pivoted to the main pivot pin B, I provide two hooks M and M', each of which is substantially in the form of a bell crank lever, having the upper arm terminating in a hook m, and the two lower arms connected together by the tie rod m². Thus these two hooks may be swung simultaneously about the pivot B.

For use with the other parts of the tool which have just been described I preferably provide two skid pieces P and P' which are reversely disposed, as shown in Fig. 2, and have their forward ends bent inwards, as at p', and their rear ends terminating in a hook p². These two skids may be carried separately, but to prevent same from being lost or mislaid they are conveniently attached to the body of the tool by means of the chains Q. These skid chains may be conveniently attached to the forward portion of the upper swinging arm E. These skids serve as tracks over which the loosened part of the tire is withdrawn, as will be hereinafter described.

The operation of the device is as follows:—
Suppose the tool to have its parts in the position shown in Figs. 1, 2 and 3 with the handle detached. Of course the skid pieces P and P' would then be hanging down from the chains, but would not interfere with the operation of the tool. Now snap the handle over the rear end of the screw D and turn the screw sufficiently to cause the pusher head c³ to project above the upper edge r of the clincher rim R, engaging in the groove t above the bead t' of the tire shoe T. Then the pusher head c³ is forced into the position shown in Fig. 7, and the preliminary work of removing the tire is begun.

The operator pressing forward on the tool, will press the bead t' inwards until clearance enough between the tire shoe and the rim is provided for the insertion of the hooks M and M', causing these hooks to engage the outer edge of the rim, as shown in Fig. 8. Continuing to turn the screw D will cause the pusher arm C to move still further outwards, passing beneath the bead of the tire and lifting the same and the inner tube contained therein, and finally bringing up against the inner wall at the opposite side of the shoe, as shown in Fig. 8. The first step incident to the removal of the tire is now complete, the parts being in the position shown in Fig. 8.

Then the second step begins; the handle is shifted from the screw D to the screw H, and the lower arm being allowed to remain in the substantially horizontal position shown in Fig. 8, the upper arm E is swung upwards about its pivot, and at the same time the stripper heads $F^3$ are pressed forwards by turning the screw H; the parts shortly assuming the position shown in Fig. 9 with the stripper heads engaging beneath the opposite bead of the tire.

Now when the parts are in this position, insert the skids P and P' as far apart from each other and from the axis of the tool as the clearance between the tire and the rim will permit, but this distance will not be greater than the length of the attaching chains Q.

When the skids are in place, shift the handle back to the screw D and withdraw the pusher arm C, permitting the inner bead of the tire to rest on the skids, and when the handle is removed the lower arm A will swing down to the position shown in Fig. 10. Now shift the handle back to the screw H and pushing the stripper heads forward, and bearing down on the arm E, will cause both beads of the tire to be lifted out of the rim, and the further rotation of the screw H will cause the yoke of the stripper heads to pass entirely beneath the beads of the tire and support the same at two points, and the hooks $f^3$ of the stripper heads will engage outside of the opposite bead of the tire, as shown in Fig. 10. At the same time the skids serve to support the lifted tire bead at adjacent points.

Now by reversing the rotation of the screw H, part of the tire may be drawn to the left, as shown in Fig. 10, and, sliding on the skids and the yoke referred to, part of the tire will become wholly clear of the rim and the whole tire may be readily removed from the rim.

The complete operation may be quickly done and even the heaviest tire may be removed with great facility, and the fresh tire may be then inserted in the usual way.

While I have illustrated and described the preferred form of the invention, it will be obvious that various modifications might be made in the construction, combination and arrangement of parts, which could be used without departing from the spirit of my invention; and I do not mean to limit the invention to such details except as particularly pointed out in the claims.

Having thus described my invention what I claim and desire to secure by Letters Patent of the United States is:—

1. A tool for removing pneumatic tires comprising two hollow arms arranged to swing in the same plane about a pivot, a screw journaled in each arm, a pusher arm provided with a head adapted to engage the tire and slidably mounted in one of said arms and provided with a nut engaging said screw, and a stripper arm carrying a stripper head slidably mounted in the other of said pivoted arms and also provided with a nut adapted to engage the corresponding screw, with means for rotating either of said screws as desired.

2. A tool for removing pneumatic tires comprising two hollow arms arranged to swing in the same plane about a pivot, a screw journaled in each arm, a pusher arm provided with a head adapted to engage the tire and slidably mounted in one of said arms and provided with a nut engaging said screw, a stripper arm carrying a stripper head slidably mounted in the other of said pivoted arms and also provided with a nut adapted to engage the corresponding screw, with means for rotating either of said screws as desired, and a pair of hooks adapted to engage the rim of the wheel.

3. A tool for removing pneumatic tires comprising a transverse pivot pin, two hollow arms arranged to swing about said pivot pin, a screw journaled in each arm, a pusher arm provided with a head adapted to engage the tire and slidably mounted in one of said arms and provided with a nut engaging said screw, and a stripper arm carrying a stripper head slidably mounted in the other of said pivoted arms and also provided with a nut adapted to engage the corresponding screw, with means for rotating either of said screws as desired.

4. A tool for removing pneumatic tires comprising a transverse pivot pin, two hollow arms arranged to swing about said pivot pin, a screw journaled in each arm, a pusher arm provided with a head adapted to engage the tire and slidably mounted in one of said arms and provided with a nut engaging said screw, a stripper arm carrying a stripper head slidably mounted in the other of said pivoted arms and also provided with a nut adapted to engage the corresponding screw, with means for rotating either of said screws as desired, and a pair of hooks adapted to engage the rim of the wheel.

ANDRÉ JULES MICHELIN.